United States Patent [19]

Sugahara et al.

[11] 4,265,864
[45] May 5, 1981

[54] PROCESS FOR TREATING BAUXITE OR SIMILAR RAW MATERIAL

[75] Inventors: Yujiro Sugahara, Tokyo; Hiroyuki Naito; Kiyoshi Takai, both of Tsuruoka; Shigehisa Imafuku, Nakajo, all of Japan

[73] Assignee: Mizusawa Kagaku Kogyo Kabushiki Kaisha, Osaka, Japan

[21] Appl. No.: 11,544

[22] Filed: Feb. 12, 1979

[30] Foreign Application Priority Data

Feb. 13, 1978 [JP] Japan .................................. 53/14043

[51] Int. Cl.³ .............................................. C01F 7/08
[52] U.S. Cl. .................... 423/121; 423/119; 423/120; 423/131; 423/137
[58] Field of Search ............... 423/119, 120, 121, 131, 423/137

[56] References Cited

U.S. PATENT DOCUMENTS

| 1,591,365 | 7/1923 | Cowles | 423/131 |
| 1,891,608 | 12/1932 | Scheidt | 423/131 |
| 1,926,744 | 9/1933 | James | 423/131 |
| 1,971,354 | 8/1934 | Scheidt et al. | 423/131 |
| 2,141,132 | 12/1938 | Folger | 423/131 |
| 2,420,852 | 5/1947 | Archibald | 423/131 |
| 3,057,683 | 10/1962 | Lecis et al. | 423/131 |
| 3,856,512 | 12/1974 | Palmer et al. | 423/119 |
| 4,045,537 | 8/1977 | Hrishikesan | 423/131 |
| 4,087,510 | 5/1978 | Steenken | 423/119 |

OTHER PUBLICATIONS

Edwards et al, "Aluminum and Its Production,", vol. 1, McGraw-Hill Co., N.Y. 1930, pp. 131-134.

Primary Examiner—Herbert T. Carter
Attorney, Agent, or Firm—Sherman & Shalloway

[57] ABSTRACT

When an alkali such as an alkali metal bicarbonate or carbonate is intimately mixed with bauxite or other alumina-containing raw material at an $Al_2O_3/Na_2O$ molar ratio of from 1/1 to 1/3 and the mixture is molded into granules, then calcined and extracted with an aqueous medium, the alumina component can be recovered in a high yield in the form of an aqueous solution of an alkali metal aluminate. The alkali component is not substantially contained in the residue left after recovery of this aqueous solution.

12 Claims, No Drawings

PROCESS FOR TREATING BAUXITE OR SIMILAR RAW MATERIAL

This invention relates to a process for treating bauxite or a similar raw material. More particularly, the invention relates to a process for treating bauxite or a similar raw material, which comprises intimately mixing bauxite or a similar raw material (hereinafter referred to as "alumina-containing material") with at least one member selected from the group consisting of an alkali metal carbonate, an alkali metal bicarbonate, an alkali metal nitrate and an alkali metal hydroxide (hereinafter referred to as "alkali"), the mixing molar ratio of the alumina component to the alkali component as $Na_2O$ being in the following range:

$Al_2O_3:Na_2O$ = from 1:1 to 1:3, molding the mixture into granules, calcining the granules at a temperature of 300° to 950° C., leaching the calcined granules with an aqueous medium, and thereby recovering the alumina component in the form of an aqueous solution of an alkali metal aluminate.

Industrial recovery of an alumina component from bauxite has heretofore been conducted according to the so-called Bayer process comprising charging bauxite as a starting ore and an aqueous solution of sodium hydroxide in an autoclave, heat-treating the mixture at a temperature of 150° to 300° C. under a pressure of 2 to 5 atmospheres, and thereby leaching out the alumina component in the form of an aqueous solution of an alkali metal aluminate. In this Bayer process, a considerable amount of sodium hydroxide is contained in a residue so-called "red mud", and when this red mud is discarded or is used for reclamation, a problem of environmental pollution is caused by elution of sodium hydroxide. Red mud left as a residue after the autoclave treatment is one of substances, filtration of which is most difficult, and red mud can hardly be separated by filtration using a conventional filter device such as a filter press. Accordingly, red mud has heretofore been separated by sedimentation separation using a thickener or the like. It is therefore practically impossible to prevent free caustic alkali or alkali metal aluminate from being left in red mud.

There has been proposed Le Chatelier's process comprising calcining a mixture of bauxite and powder of sodium carbonate at a high temperature exceeding 1000° C. or 1300° C. and eluting out sodium aluminate from the calcination product. This process, however, is not satisfactory because a high temperature treatment has to be carried out and the ratio of recovery of sodium aluminate is low, and therefore, this process has not been conducted on an industrial scale.

We found that when an alkali such as an alkali metal carbonate is intimately mixed with bauxite or an alumina containing raw material while the molar ratio of the alumina component to the alkali component expressed as $Na_2O$ is adjusted in the following range:

$Al_2O_3:Na_2O$ = from 1:1 to 1:3 and the mixture is molded into granules prior to calcination, the alumina component can be converted to an alkali metal aluminate easily soluble in an aqueous medium by conducting calcination at a relatively low temperature for a relatively short time, and the residue left after leaching of the calcination product with an aqueous medium is very excellent in adaptability to filtration and the residue can be separated in the substantially alkali-free state.

It is therefore a primary object of the present invention to provide a granulation treatment process in which an alumina component contained in bauxite or an alumina containing raw material is recovered in the form of an aqueous solution of an alkali metal aluminate while a free alkali is substantially prevented from being left in the residue.

Another object of the present invention is to provide a granulation treatment process in which reaction of an alumina component contained in bauxite or an alumina containing raw material with an alkali metal carbonate, an alkali metal bicarbonate, an alkali metal nitrate or an alkali metal hydroxide can be carried out at a relatively low temperature for a short time while keeping the reactants in the form of solid granules.

Still another object of the present invention is to provide a granulation treatment process in which an alumina component can easily be extracted in the form of an alkali metal aluminate even from bauxite or an alumina containing raw material having such a low reactivity that it can hardly be treated according to the conventional Bayer process.

These and other objects of the present invention can be attained by the above-mentioned granulation treatment process.

As the bauxite, there can be used any of ores containing the alumina component in the form of gypsite [$\gamma$-Al(OH)$_3$], boehmite [$\gamma$-AlO(OH)], diaspore [$\alpha$-AlOOH], or the like. The alumina content in the starting bauxite is not particularly critical, but bauxite having an alumina content of 40 to 70% by weight as $Al_2O_3$ is ordinarily easily available. Such bauxite ordinarily contains impurities such as kaoline clay, allophane, opal, limonite, ilmenite and rutile. An instance of the chemical composition of bauxite is shown in Table A.

TABLE A

| | |
|---|---|
| $Al_2O_3$ | 50–88% by weight |
| $Fe_2O_3$ | 1.5–18% by weight |
| CaO | 1.0–0.1% by weight |
| $SiO_2$ | 2.5–12% by weight |
| $TiO_2$ | 0.5–6.3% by weight |
| $V_2O_5$ | 0.07–0.001% by weight |
| $Cr_2O_3$ | 0.01–0.001% by weight |
| ignition loss | 2–30% by weight |

When bauxite containing the alumina component in the form of diaspore is treated according to the Bayer process, the alumina component cannot be recovered satisfactorily. According to this invention, by calcining a mixture of such bauxite and an alkali in the form of granules, the alumina component can be effectively extracted even from such bauxite.

As the raw material containing the alumina component, there can be used a raw material having a chemical composition similar to that of bauxite. For example, an alumina containing clay (acid clay and alumina shale), or in the industry of manufacture of activated clay, pressure-sensitive color former and activated silicic acid by an acid treatment of a montmorillonite group clay mineral such as acid clay, an extract containing the alumina and iron components of the clay is formed. Further, in a plant where various service waters, waste waters and sludges are treated with coagulants and coagulated or precipitated solids are calcined according to need, residues containing the alumina and iron components are formed. These alumina-containing by-products or residues can be used as the raw material in this invention singly or in combination with bauxite.

As the alkali, there can be used carbonates, bicarbonates, nitrates and hydroxides of alkali metals such as sodium and potassium, and mixtures thereof. According to the granulation treatment process of the present invention, even when such alkali as an alkali metal carbonate or alkali metal bicarbonate is employed, the alumina component can be converted to a form that can easily be extracted with an aqueous medium, by conducting calcination at a relatively low temperature for a short time. This is one of prominent advantages attained by this invention. Alkali metal carbonates and bicarbonates may be amorphous or crystalline. Further, they may contain such impurities as sodium chloride and ammonium chloride.

The alkali component is incorporated into bauxite or an alumina containing raw material in such an amount that the molar ratio of the aluminum component to the alkali component as $Na_2O$, namely the $Al_2O_3:Na_2O$ molar ratio, is in the range of from 1:1 to 1:3, preferably from 1:1 to 1:2, especially preferably from 1:1 to 1:1.6, though the preferred amount varies to some extent depending on the kind of the alkali component or starting material.

In the case where a silica component is contained in the alumina-containing starting material, in order to prevent the added alkali from reacting with the silica component, lime or slaked lime may be added together with the above-mentioned alkali component. It is preferred that the lime component be incorporated in such an amount that the $SiO_2:CaO$ molar ratio is in the range of from 1:1 to 1:1.5, especially from 1:1.1 to 1:1.4.

In the case where heavy metal component, especially vanadium component is contained in the alumina-containing starting material, in order to eliminate or remarkably moderate tendency of the heavy metal component to migrate into the aqueous medium for extraction, lime and reducing agent may be added together with the above mentioned alkali component. It is preferred that the lime be incorporated in an amount of 1 to 25% by weight based on the raw material and that the reducing agent be incorporated in an amount of 1 to 25% by weight, the preferred reducing agent is finely divided carbon such as activated carbon or powder of metal reactive with the alkali, e.g. metallic aluminum.

In this invention, in order to convert the alumina component to a water-extractable alkali metal aluminate by conducting calcination in the solid phase at a relatively low temperature for a short time, it is very important that bauxite or an alumina containing raw material should be intimately mixed with an alkali prior to granulation. Intimate mixing of the alumina-containing raw material and alkali can be advantageously accomplished by co-pulverization of the raw material and alkali.

As the pulverizer for this intimate mixing, there can advantageously be used a ball mill, a disc pulverizer, a grinding mill, a colloid mill, a jet pulverizer and the like fine pulverizer. Indeed, it is possible to finely pulverize the raw material and the alkali separately and mix the resulting powders by agitation in a mixer. However, a higher intimate mixing state can be attained by co-pulverization than the intimate mixing state attained by this method. It is preferred that co-pulverization be carried out to such an extent that respective particles have a size smaller than $50\mu$. For attaining this intimate mixing, it is possible to perform wet pulverization by adding a liquid medium such as an aqueous medium at the co-pulverization step.

Granulation of the so formed intimate mixture of the alumina-containing raw material and the alkali can be accomplished by any of dry and wet granulation means. For example, the intimate mixture may be dry-granulated by using a granulating machine such as a tablet machine, or there may be adopted a method in which the liquid medium contained in the intimate mixture, such as water, is utilized or a granulation medium such as water is positively added to the intimate mixture and wet granulation is carried out by known means, for example, extrusion granulation, rolling granulation, flaking granulation and mixing granulation. It is ordinarily preferred that granulation be carried out by using a granulation medium such as water, because the shape-retaining property of the granules is increased and calcination can be accomplished at a lower temperature in a shorter time. In case of wet granulation, it is preferred that the granulation medium, especially water, be used in an amount of 1 to 100% by weight, especially 2 to 50% by weight, based on the alumina-containing raw material.

The size of granules can be changed in the range of 0.05 to 30 mm, especially 0.1 to 20 mm. However, in order to accomplish the heat treatment in a relatively short time, it is preferred that the size of the granules be relatively small and less than 15 mm. The granules may have an optional shape, for example, a spherical, sand-like, columnar, cubic or other granular shape. In order to perform the heat treatment continuously, from the viewpoint of easiness in handling, it is preferred that the shape of granules be substantially spherical.

The so obtained granules are heat-treated at a temperature of 300° to 950° C., especially 450° to 900° C., though the heat treatment temperature is changed to some extent depending on the kind of the alkali used. For example, when a carbonate, bicarbonate or nitrate is used as the alkali, it is preferred that the heat treatment be carried out at 750° to 950° C., especially 800° to 900° C., and when a hydroxide is used as the alkali, it is preferred that the heat treatment be carried out at 300° to 500° C., especially 350° to 450° C.

It is quite surprising that in the present invention, even when an alkali metal carbonate or bicarbonate is used as the alkali, reaction of the alkali with the alumina component is caused at the above-mentioned relatively low temperature. As is seen from the fact that sodium carbonate shows only a dissociation pressure of 19 mmHg at 1000° C., only very gradual decomposition is caused in sodium carbonate at a temperature of about 1000° C. In fact, when mixed granules of pure aluminum hydroxide and an alkali metal carbonate is heat-treated at 900° C., only about 60% of the aluminum hydroxide is converted to a water-soluble alkali metal aluminate. In contrast, when granules of a mixture of bauxite or a similar raw material and an alkali metal carbonate is heat-treated at the same temperature according to this invention, more than 90% of the alumina component can be converted to a water-soluble alkali metal aluminate.

The reason why preparation of a water-soluble alkali metal aluminate is possible at such a low temperature in the present invention by using bauxite or an alumina containing raw material is unknown, but in view of the foregoing fact, it is considered that impurities contained in bauxite or the alumina containing raw material, such as iron, will perform a catalytic action.

From the foregoing viewpoint, in this invention, it is preferred that the content of iron as $Fe_2O_2$ in the starting raw material be 2 to 95% by weight, especially 5 to 90% by weight, based on the alumina component as $Al_2O_3$.

The heat treatment can be performed very easily in a heating furnace of the fixed bed, moving bed or fluidized bed type by utilizing characteristics of granules effectively. It is one of prominent advantages of the present invention that the heat treatment can be performed in a continuous manner by using a moving bed type furnace such as a rotary kiln, a shaft kiln or a zigzag type longitudinal furnace. The treatment time is changed depending on the temperature or the heat treatment method adopted. An appropriate heat treatment time is experimentally determined within a range of from 5 to 60 minutes, especially 10 to 30 minutes.

In the heat treatment of the granular mixture, carbon dioxide gas is generated when a carbonate or bicarbonate is used as the alkali. This carbon dioxide gas may be recycled to the process for production of an alkali metal carbonate or bicarbonate according to the Solvay method, the Le Chatelier method or the Schlesinger method, or it may be used for production of calcium carbonate and the like. When an alkali metal nitrate is employed, $NO_x$ gas is generated by the heat treatment. This $NO_x$ gas can be recovered in the form of nitric acid according to known means and the applied to various uses.

When an intimate granular mixture of the alumina-containing raw material and alkali is heat-treated according to the present invention, humin and other organic substances contained in bauxite or an acid extract of clay are removed by calcination and therefore, the resulting alkali metal aluminate is excellent over the alkali metal aluminate obtained according to the Bayer process with respect to the hue. This is another prominent advantage attained by this invention.

Further, when an alkali metal carbonate or bicarbonate is used as the alkali and a granular mixture of this alkali and an alumina-containing raw material is heat-treated at the above-mentioned temperature according to the present invention, a very great advantage described below can be attained. When a granular mixture of an alkali metal hydroxide and bauxite is calcined, the alkali metal hydroxide is reacted with an acid component contained in bauxite, such as a silica component, and therefore, the alkali component is wastefully consumed and the formed alkali metal silicate is readily dissolved out into the aqueous medium at the subsequent extraction step, causing various troubles. In contrast, when an alkali metal carbonate or bicarbonate is used as the alkali, such alkali component reacts selectively with the alumina component at the heat treatment step, and therefore, wasteful consumption of the alkali component by reacting with the acid component or tendency of the by-product to migrate into the aqueous medium for extraction can be eliminated or remarkably moderated.

In this invention, the heat-treated granules are extracted with an aqueous medium and the alkali metal aluminate in the granules is recovered in the form of an aqueous solution. In the heat-treated granules, there is formed an alkali metal aluminate corresponding to the following oxide formula:

$$mNa_2O \cdot Al_2O_3$$

wherein m is a number of from 1 to 3.5, especially from 1.1 to 2.6, though the value of m differs to some extent according to the amount used of the alkali component. In short, the alumina component is converted to a form easily soluble in an aqueous medium by the above-mentioned heat treatment.

Not only water but also an aqueous solution containing an alkali in an amount of up to about 10% can be used as the aqueous medium. When the content of the alkali component in the granules is relatively low, the recovery ratio of the alumina component can be improved by using an aqueous solution of an alkali as the extraction medium. Further, undesirable hydrolysis of the alkali metal aluminate can be prevented by the use of an aqueous solution of an alkali. In view of the foregoing, it is preferred to use an aqueous solution of an alkali having a concentration of 0.5 to 10%, especially 1 to 7 %, as the extraction aqueous medium.

When the heat-treated granules are thrown into the aqueous medium, the granules are readily crumbled into fine particles and the contained alkali metal aluminate can be extracted at a high efficiency. As the extraction temperature is higher, the extraction speed becomes higher. It is preferred that the extraction be carried out at a temperature of 30° to 120° C., especially 60° to 100° C. The extraction time is changed according to the extraction temperature, but good results can ordinarily be obtained when the extraction is conducted for a relatively short time, that is, 5 to 120 minutes, especially 10 to 60 minutes.

The extraction can be performed according to an optional batchwise, continuous or semi-continuous solid-liquid extraction method. For example, the extraction operation is conducted by using an agitation type extraction vessel, a mixer settler, a filter press type extracting device, a packed column type extracting device or a rotary lateral continuous extraction apparatus.

According to this invention, by virtue of the feature that granules of an alumina-containing raw material and an alkali are calcined and then extracted with an aqueous medium, separation of an aqueous solution of an alkali metal aluminate from the extraction residue can be performed very easily. This is still another prominent advantage attained by the present invention. The residue left after extraction of the alkali metal aluminate is very excellent in the adaptability to filtration, and the residue can be separated in the state substantially free of the alkali component.

For filtration and separation of the extraction residue, there can be used any of known filtering devices such as a filter press, a belt filter, a drum filter and a compression leaf filter. Further, centrifugal separation, decantation and other solid-liquid separation means can be adopted. In order to remove the alkali component from the residue, the separated residue may be subjected to the water washing treatment once or several times.

According to the above-mentioned process of the present invention, an alumina component can be recovered in the form of a solution of an alkali metal aluminate in a high yield from bauxite or an alumina containing raw material while a free alkali is not substantially left in the residue. Further, according to this invention, an alkali metal aluminate can be recovered in a relatively pure form without wasteful consumption of the alkali component. This is another unexpected advantage attained by the present invention.

The alkali metal aluminate recovered according to the process of this invention can be effectively used for various purposes by utilizing the above-mentioned advantage. For example, it can be used for the production of alumina sol, alumina gel and finely divided alumina and for the synthesis of zeolites.

The present invention will now be described in detail by reference to the following Examples that by means limit the scope of the invention.

EXAMPLE 1

A process in which at the step of heat-treating bauxite with the use of sodium carbonate, granules that can easily be handled are heat-treated and sodium aluminate is recovered from the heated granules in a high yield by the leaching treatment with warm water is illustrated.

For recovery of sodium aluminate, the step A of mixing of starting materials and molding the mixture into granules, the step B of heat-treating the granules and the step C of leaching the heated granules with warm water were carried out in this order.

Six bauxites shown in Table 1 were chosen and used as the starting bauxite.

Sodium bicarbonate ($NaHCO_3$) commercially available as an industrial reagent was used as the alkali (sodium bicarbonate was used as the alkali in Examples given hereinafter unless otherwise indicated).

In a pot mill having a capacity of 20 l, 1 Kg of bauxite Comalco produced in Australia and 1.5 Kg of sodium bicarbonate (the amount of sodium bicarbonate corresponded to 1.6 equivalents of the amount of sodium necessary for formation of $NaAlO_2$ per atom of aluminum contained in bauxite) were mixed for 3 hours by dry pulverization using pulverizing balls composed of alumina. Then, 2.6 Kg of the mixture was transferred in a rolling granulator, and while water as the granulation medium was sprayed onto the starting bauxite in an amount of 2% by weight, the mixture was molded into granules having a diameter of 5 to 10 mm and the granules were dried for 1 hour on an evaporating drying shelf to obtain 2.6 Kg of dry granules. For the heat treatment of the dry granules, a rotary kiln type heating furnace described below was used, and the heat treatment was conducted in a continuous manner.

Namely, the interior of an iron kiln having a diameter of 0.5 m and a length of 2 m was lined with a refractory cement composed mainly of alumina (Castable 160-A manufactured by Nichibei Rozai Kabushiki Kaisha) so that the inner diameter was 0.3 m, and two electric stick heaters (by SiC) were set in the kiln as the heat generator and rotated at 2 rpm to maintain the interior at 850° C.

In the rotary furnace maintained at 850° C., 2.6 Kg of the granules were continuously thrown, and the heat treatment was conducted for about 10 minutes to obtain a porous granulation product having a yellowish green hue in an amount of 1.7 Kg corresponding substantially to a yield of 100%.

In the same manner as described above, Seaba, Gove, Bintan, UCC and Suralco bauxites shown in Table 1 were treated, and yellowish green or yellow porous granulation products were obtained in yields of substantially 100%.

TABLE 1

| Component (% by weight) | Comalco (produced in Australia) | Seaba (produced in Malaysia) | Gove (produced in Australia) | Bintan (produced in Indonesia) | UCC (produced in India) | Suralco (produced in Surinam) |
|---|---|---|---|---|---|---|
| $Al_2O_3$ | 57.5 | 57.1 | 49.2 | 53.9 | 58 | 87.4 |
| $Fe_2O_3$ | 7.5 | 2.9 | 18.6 | 10.9 | 2.5 | 6.4 |
| $SiO_2$ | 6.5 | 10.0 | 2.7 | 5.3 | 2.5 | 2.5 |
| $TiO_2$ | 2.7 | 0.3 | 3.4 | 0.8 | 3.0 | 3.6 |
| ignition loss* | 25.8 | 29.7 | 26.1 | 29.1 | 34.0 | 0.2 |

Note
*ignition loss plus water content

Then, each of the so recovered 6 granulation products was charged in a stainless steel vessel having a capacity of 10 l, and 4 l of water was added thereto. The mixture was agitated under heating above 80° C. by an electric heater for about 20 minutes to effect a leaching treatment under agitation with warm water. Then, filtration under reduced pressure was carried out by using a Buchner funnel having a diameter of 20 cm. In each case, a good adaptability to the filtration operation was observed, and the mixture was instantaneously separated into a cake and a filtrate. Subsequently, the cake was washed with 1.5 l of warm water (about 80° C.). In each case, 5.4 to 5.5 l of a colorless very light green extract containing sodium aluminate as the main component and having a pH of 12.7 to 13 was recovered. The alumina content in each extract was determined by analysis, and the ratio of recovery of the alumina component as sodium aluminate ($NaAlO_2$) was calculated from the alumina content in the starting alumina. Obtained results are shown in Table 2. Further, the soda component as $Na_2O$ in the residual cake was analyzed, and the loss of the used alkali ($Na_2O$) was determined and expressed as the amount of the soda component left in the residual cake. (In this Example and subsequent Examples, all of "%" are by weight unless otherwise indicated.)

TABLE 2

| Run No. | Bauxite | Amount (equivalents) of Alkali Added | Heat Treatment Temperature(°C.) | Heat Treatment Time minutes | $NaAlO_2$ Recovery Ratio (%) | Amount (%) of Soda Left in Cake |
|---|---|---|---|---|---|---|
| 1-1 | Comalco | 1.6 | 850 | 10 | 94.8 | 0.3 |
| 1-2 | Seaba | 1.6 | 850 | 10 | 90.4 | 0.5 |
| 1-3 | Gove | 1.6 | 850 | 10 | 96.8 | 0.6 |
| 1-4 | Bintan | 1.6 | 850 | 10 | 94.6 | 0.4 |
| 1-5 | UCC | 1.6 | 850 | 10 | 84.5 | 1.1 |

TABLE 2-continued

| Run No. | Bauxite | Amount (equivalents) of Alkali Added | Heat Treatment Temperature(°C.) | Heat Treatment Time minutes | $NaAlO_2$ Recovery Ratio (%) | Amount (%) of Soda Left in Cake |
|---|---|---|---|---|---|---|
| 1-6 | Suralco | 1.6 | 850 | 10 | 86.5 | 2.6 |

From the foregoing results, when sodium carbonate is used as the alkali and the starting bauxite is molded into granules prior to the heat treatment, the granules can be treated while retaining the granular form throughout the treatment process, and there can be attained various advantages over the conventional alkali solution treatment according to the Bayer process and the treatment process described in Comparative Examples given hereinafter. For example, handling can be facilitated throughout the treatment process, the treatment time can be remarkably shortened, and since the mixture is not molten during the treatment process, the mixture does not adhere to or permeate into the furnace material. Furthermore, the loss of the starting materials and corrosion of the furnace material can be prevented. Moreover, since the mixture is handled in the granular form, dusts are not generated and contamination of working environment is not caused. Still in addition, a continuous treatment can be performed very easily, and organic materials contained in the starting bauxite can be removed by calcination and sodium aluminate having a much reduced color can easily be recovered in a high yield.

As will be apparent from the data of the amount of the residual soda component shown in Table 2, filtration after warm water leaching can be accomplished very easily and the amount of the sodium component left in the filtration residue can be remarkably reduced. Therefore, troubles are hardly caused in the post treatment of the leaching residue or by discarding of the leaching residue. Further, the loss of the soda component can be remarkably reduced and the treatment is advantageous from the economical viewpoint.

EXAMPLE 2

Influences of treatment conditions such as the treatment time in the heat treatment of bauxite granules are illustrated.

Comalco and Seaba bauxites were chosen among 6 bauxites used in Example 1. More specifically, 1 Kg of the bauxite was treated under conditions similar to those described in Example 1 to obtain 2.6 to 2.7 Kg of dry granules. Thus, 6 kinds of dry granules were prepared. With respect to Seaba bauxite, about 10% by weight of lime (CaO) was added as a granulation assistant and the mixture was molded into granules.

Each of the so obtained 6 kinds of dry granules was thrown into the rotary furnace described in Example 1 and heat-treated while adjusting the rotation speed to control the residence time of the granules in the furnace. Namely, the heat treatment was conducted at 850° C. while adjusting the residence time to 5 to 30 minutes. In each run, a yellowish green granulation product was obtained.

In the same manner as described in Example 1, the heat-treated granules were subjected to the leaching treatment with water as a leaching medium under heating and agitation to recover sodium aluminate. The recovery ratio was determined to obtain results shown in Table 3.

TABLE 3

| Run. No. | Bauvite | Amount (%) of Added Lime* | Amount (equivalents) of Added Alkali | Heat Treatment Temperature (°C.) | Heat Treatment Time (minutes) | $NaAlO_2$ Recovery Ratio (%) |
|---|---|---|---|---|---|---|
| 2-1 | Comalco | 0 | 1.6 | 850 | 5 | 86.4 |
| 2-2 | " | 0 | 1.6 | 850 | 30 | 95.0 |
| 2-3 | Seaba | 0 | 1.6 | 850 | 5 | 76.4 |
| 2-4 | " | 0 | 1.6 | 850 | 30 | 89.6 |
| 2-5 | " | 10 | 1.6 | 850 | 5 | 82.5 |
| 2-6 | " | 10 | 1.6 | 850 | 30 | 93.4 |

Note
*% by weight based on starting bauxite

From the results shown in Table 3, it will readily by understood that when the alumina component is recovered in the form of sodium aluminate from bauxite by the rotary furnace treatment, if the heat treatment time is adjusted to 5 to 30 minutes, preferably 10 minutes as in Example 1, the heat treatment is appropriately conducted and sodium aluminate can be recovered in a high yield.

EXAMPLE 3

Influences of the heat treatment temperature in the heat treatment of bauxite granules are illustrated.

Comalco bauxite was chosen and used as the starting bauxite, and in the same manner as described in Example 1, 1.3 Kg of a dry granulation product was prepared from 0.5 Kg of the bauxite and 0.8 Kg of sodium bicarbonate as the alkali. Then, the dry granulation product was charged in the rotary furnace described in Example 1 and the heat treatment was carried out at a treatment temperature shown in Table 4 for a treatment time shown in Table 4. Then, the heat-treated granules were subjected to the leaching treatment with water under heating and agitation to recover sodium aluminate. The sodium aluminate recovery ratio was determined to obtain results shown in Table 4.

TABLE 4

| Run No. | Bauxite | Amount (equivalents) of Added Alkali | Heat Treatment Temperature (°C.) | Heat Treatment time (minutes) | $NaAlO_2$ Recovery Ratio (%) |
|---|---|---|---|---|---|
| 3-1 | Comalco | 1.6 | 750 | 15 | 53.6 |
| 3-2 | " | 1.6 | 750 | 30 | 64.5 |
| 3-3 | " | 1.6 | 800 | 10 | 92.4 |
| 3-4 | " | 1.6 | 800 | 30 | 93.5 |
| 3-5 | " | 1.6 | 900 | 10 | 93.4 |
| 3-6 | " | 1.6 | 950 | 10 | 96.4 |

From the results shown in Table 4, it will readily be understood that conversion of the alumina component to sodium aluminate is considerably advanced even at such a low temperature as 750° C. but in case of a granular mixture of Comalco bauxite and sodium bicarbonate, in order to conduct the heat treatment sufficiently, it is preferred that the heat treatment temperature be adjusted to 800° to 950° C.

EXAMPLE 4

Influences of the amount added of an alkali in the heat treatment of bauxite granules are illustrated.

Coamlco and Seaba bauxites were chosen and used as the starting bauxite. An alkali (sodium bicarbonate) in an amount indicated in Table 5 was added to 0.5 Kg of the starting bauxite and the mixture was heat-treated in a rotary furnace in the same manner as described in Example 1. Sodium aluminate was recovered by a leaching treatment with water under heating and agitation, and the recovery ratio was determined to obtain results shown in Table 5.

TABLE 5

| Run No. | Bauxite | Amount (equivalents) of Added Alkali | Heat Treatment Temperature (°C.) | Heat Treatment Time (minutes) | $NaAlO_2$ Recovery Ratio (%) |
|---|---|---|---|---|---|
| 4-1 | Comalco | 1.0 | 850 | 10 | 76.5 |
| 4-2 | " | 1.2 | 850 | 10 | 84.8 |
| 4-3 | " | 1.4 | 850 | 10 | 93.6 |
| 4-4 | Seaba | 1.0 | 850 | 10 | 56.4 |
| 4-5 | " | 1.4 | 850 | 10 | 86.4 |
| 4-6 | " | 1.8 | 850 | 10 | 91.4 |
| 4-7 | " | 2.1 | 850 | 10 | 92.2 |
| 4-8 | " | 3.0 | 850 | 10 | 92.6 |

As will readily be understood from the results shown in Table 5, the amount of sodium bicarbonate as the alkali should be at least 1 equivalent, preferably at least 1.2 equivalents, though the preferred amount differs to some extent depending on the kind of the used bauxite.

EXAMPLE 5

Artificial bauxites having a composition shown in Table 6 was prepared. An alkali was added to each artificial bauxite and the mixture was granulated. Then, the granulation product was heat-treated and sodium aluminate was recovered from the heat-treated granules.

TABLE 6

| Artificial Bauxite No. | Composition (% by weight) | | | |
|---|---|---|---|---|
| | $Fe_2O_3$ | $Al_2O_3$ | CaO | MgO |
| 1 | — | 100 | — | — |
| 2 | 17.5 | 82.5 | — | — |
| 3 | 43 | 57 | — | — |
| 4 | 33 | 57 | 10 | — |
| 5 | 32.2 | 57 | 6.4 | 5.4 |

The artificial bauxite was prepared in the following manner.

Solutions of nitrates of commercially available iron (reagent of class 1), aluminum, calcium and magnesium were formed into a mixed solution (synthetic nitrate solution) corresponding to the composition shown in Table 6, and the mixed solution was evaporated to dryness and the resulting solid was calcined at 600° C. for 1 hour, pulverized in a mortar and passed through a 200-mesh sieve to obtain a powder of an artificial bauxite composition.

In the same manner as described in Example 1, sodium carbonate was added to the artificial bauxite composition in an amount of 1.6 equivalents based on the alumina component contained in the artificial bauxite, and the mixture was passed through a 100-mesh sieve, charged in a vinyl resin bag and sufficiently shaken to form a homogeneous mixture. Then, an appropriate amount of water was scattered on the mixture and it was shaken to form granules having a size of 5 to 10 mm. The granules were placed on a porcelain evaporating dish and stationarily calcined at 850° C. for 10 minutes. In the same manner as described in Example 1, the calcined granules subjected to the leaching treatment with water as the medium under heating and agitation to recover a solution of sodium aluminate. The recovery ratio of sodium aluminate was determined to obtain results shown in Table 7.

TABLE 7

| Sample No. | Amount (equivalents) of Added Alkali | Heat Treatment Temperature (°C.) | Heat Treatment Time (minutes) | $NaAlO_2$ Recovery Ratio (%) |
|---|---|---|---|---|
| 1 | 1.6 | 850 | 10 | 78.9 |
| 2 | 1.6 | 850 | 10 | 92.6 |
| 3 | 1.6 | 850 | 10 | 94.6 |
| 4 | 1.6 | 850 | 10 | 96.5 |
| 5 | 1.6 | 850 | 10 | 97.4 |

As will be apparent from the results shown in Table 7, in each of artificial bauxites containing an iron component, except an artificial bauxite composed substantially of $Al_2O_3$ (Sample No. 1), the alumina can be recovered at a recovery ratio higher than 90%. Thus, it will readily be understood that when bauxite is decomposed by using sodium bicarbonate as the alkali according to the process of the present invention, the presence of an iron component in the starting raw material is indispensable for attaining a high recovery ratio, though the reason has not been elucidated. This special phenomenon caused by the presence of the iron component is quite surprising, and it will readily be understood that a naturally occurring raw material can be a preferred starting material for direct preparation of sodium aluminate on an industrial scale.

EXAMPLE 6

The heat treatment of bauxite by using an alkali other than sodium bicarbonate is illustrated.

Comalco bauxite was chosen and used as the starting bauxite, and sodium carbonate ($Na_2CO_3$), sodium carbonate plus sodium hydroxide ($NaHCO_3+NaOH$), sodium hydroxide (NaOH) or sodium nitrate ($NaNO_3$) was added as the alkali in an amount shown in Table 8 to 0.5 Kg of the starting bauxite. Granulation was carried out in the same manner as described in Example 1, and the heat treatment was conducted under conditions indicated in Table 8. Then, the leaching treatment with water was carried out under heating and agitation to recover sodium aluminate. Sodium hydroxide was used as the alkali in the form of an aqueous solution of sodium hydroxide having a concentration of 50%. In run No. 6-3, 0.5 Kg of the powdery starting bauxite passable through a 200-mesh sieve was mixed with 1.2 equivalents of sodium hydroxide in the form of an aqueous solution (having a concentration of 60%), and 0.3 Kg of slaked lime [$Ca(OH)_2$] was further added to the mixture. Then, the mixture was charged in a pug mill having a capacity of 20 l and kneaded for 10 minutes. The kneaded mixture was molded into the form of noodles by a grooved roll, and the resulting columnar granules were then subjected to the heat treatment.

The sodium aluminate recovery ratio was determined in each run to obtain results shown in Table 8.

TABLE 8

| Run No. | Alkali Used | Amount (equivalents) of Added Alkali | Heat Treatment Temperature (°C.) | Heat Treatment Time (minutes) | $NaAlO_2$ Recovery Ratio (%) |
|---|---|---|---|---|---|
| 6-1 | $Na_2CO_3$ | 1.6 | 850 | 15 | 93.6 |
| 6-2 | $NaHCO_3$ + NaOH | 1.3 + 0.3 | 850 | 15 | 94.5 |
| 6-3 | $NaNO_3$ | 1.6 | 900 | 30 | 83.9 |
| 6-4 | $NaNO_3$ | 2.5 | 900 | 15 | 90.4 |
| 6-5 | NaOH | 1.2 | 400 | 15 | 80.4 |

As will be apparent from the results shown in Table 8, even when various sodium salts are used as the alkali instead of sodium bicarbonate, if granules are subjected to the heat treatment according to the present invention, the alumina component in the starting bauxite can be effectively recovered in a high yield in the form of sodium aluminate.

COMPARATIVE EXAMPLE 1

The case where the starting material is subjected to the heat treatment without granulation is illustrated so as to clarify the characteristic features of this invention.

Comalco bauxite was chosen and used as the starting bauxite. Namely, 2 Kg of the starting bauxite was pulverized and mixed with 3.2 Kg of sodium carbonate, and 5.2 Kg of the resulting powdery mixture was charged in the rotary kiln described in Example 1, which was maintained at 850° C., over a period of about 20 minutes. On charging of the starting powder into the rotary kiln, violent scattering of dusts was caused and the starting powder adhered to the furnace wall. Accordingly, only 60% of the charged starting material was recovered.

In the same manner as described in Example 1, the heat-treated powder was subjected to the leaching treatment with water under heating and agitation to recover sodium aluminate. The recovery ratio of $NaAlO_2$ was 68.0%, and the recovery ratio based on the alumina component in the starting bauxite material was only 40.8% (=68.0×0.6).

From the results of this Comparative Example, it will readily be understood that in order to facilitate the operation and improves the recovery ratio in recovery of the alumina component from bauxite, it is very important to granulate the starting material prior to the heat treatment according to the process of the present invention.

COMPARATIVE EXAMPLE 2

In order to further clarify the characteristic features of the present invention, the following comparative experiment was carried out.

Comalco bauxite was used as the starting material and it was pulverized to recover a powder passable through a 200-mesh sieve. Then, 0.5 Kg of the powdery bauxite was charged in a stainless steel vessel having a capacity of 20 l together with 0.34 Kg of solid sodium hydroxide (corresponding to 1.6 equivalents to the alumina component in the starting bauxite) and 6 l of water. The temperature was elevated above 100° C. by an electric heater and leaching was carried out under agitation for about 30 minutes. When it was intended to perform filtration under reduced pressure in the same manner as described in Example 1, filtration was very difficult. Further, washing was very difficult. The recovered extract of sodium aluminate was different from the transparent clear solution of sodium aluminate recovered in Example 1, but it had a very dense greenish brown color. It is considered that the reason is that organic materials such as humin contained in the starting bauxite were not decomposed in this comparative process but included in the recovered sodium aluminate solution. The recovery ratio of sodium aluminate and the amount of the soda component left in the cake were determined to obtain results shown in Table 9.

TABLE 9

| Bauxite | Amount (equivalents) of Added Alkali | Leaching Temperature (°C.) | $NaAlO_2$ Recovery Ratio (%) | Amount (%) of Soda Component Left in Cake |
|---|---|---|---|---|
| Comalco | 1.6 | 100–110 | 74.6 | 8.7 |

From the above results, it will readily be understood that when powdery bauxite is heated, reacted and extracted with a solution of sodium hydroxide, the ratio of recovery of the alumina component contained in the bauxite is very low, industrial filtration after the extraction treatment is substantially impossible and the alkali component is inevitably left in the residue. Accordingly, the treatment is very difficult and troublesome. Accordingly, it will readily be understood that the process of the present invention is very excellent over this comparative process from the industrial and economical viewpoints.

EXAMPLE 7

The heat treatment of bauxite by using lime and a reducing agent together with an alkali is illustrated.

The bauxite produced in Australia and having the following composition:

| | |
|---|---|
| $Al_2O_3$ | 52.3 % |
| $SiO_2$ | 5.63 |
| $Fe_2O_3$ | 13.0 |
| CaO | 0.33 |
| MgO | 0.03 |
| $TiO_2$ | 0.71 |
| $Cr_2O_3$ | 0.0083 |
| $MnO_2$ | 0.028 |
| $V_2O_5$ | 0.017 | is chosen and used as the starting material. Sodium carbonate ($Na_2CO_3$), calcium hydroxide ($Ca(OH)_2$) and finely divided activated carbon was added in an amount shown in Table 10 to 100 g of the starting bauxite. Granulation was carried out in the same manner as described in Example 1, and the heat treatment was conducted at 850° C. for 15 minutes. Then, the leaching treatment with aqueous solution of sodium hydroxide was carried out under heating and agitation to recover sodium aluminate.

Results shown in Table 10 were obtained.

TABLE 10

| Run No. | 7-1 | 7-2 | 7-3 | 7-4 |
|---|---|---|---|---|
| Amount (g) of Added | | | | |
| $Na_2CO_3$ | 34 | 34 | 34 | 34 |
| $Ca(OH)_2$ | — | 2.5 | 5.0 | 5.0 |
| Carbon | — | — | 2.5 | 5.0 |
| Recovery Ratio (%) | | | | |
| $Na_2O$ | 93.5 | 92.9 | 97.6 | 95.2 |
| $Al_2O_3$ | 84.6 | 84.6 | 84.6 | 84.6 |
| Amount of $V_2O_5$ contained in Extracted $Al_2O_3$(mg/1 g of $Al_2O_3$) | 16.0 | 12.3 | 8.2 | 5.5 |

What we claim is:

1. A process for treating an alumina material containing 50 to 88% by weight alumina based on total weight of said material and 2 to 95% by weight of $Fe_2O_3$ based on the weight of alumina, which comprises intimately mixing said alumina material with an alkali metal carbonate or alkali metal bicarbonate at a mixing ratio of $Al_2O_3$:$Na_2O$ of from 1:1 to 1:3, molding the mixture into granules in the presence of 1 to 100% by weight of water, based on the alumina material as a granulation medium, heat-treating the granules at a temperature of to 750° to 950° C. for 5 to 30 minutes, leaching the heat-treated granules with an aqueous medium, and thereby substantially recovering the alumina from the alumina material in the form of an aqueous solution of alkali metal aluminate.

2. The process of claim 1, wherein a residue remains after recovery of the alumina and the residue is substantially free of alkali.

3. The process of claim 1, wherein at least 90% of the alumina in the alumina material is recovered.

4. The process of claim 1, wherein the alumina material contains 5 to 90% by weight of $Fe_2O_3$, based on alumina.

5. The process of claim 1, wherein the alumina material consists of bauxite.

6. The process of claim 1, wherein said alumina material and alkali metal carbonate or alkali metal bicarbonate are heat-treated at a temperature of 800° to 900° C.

7. The method of claim 1, wherein said alumina material contains a heavy metal and the alumina material is intimately mixed with 1 to 25% by weight based on weight of said alumina material of lime and 1 to 25% by weight based on weight of said alumina material of a reducing agent.

8. The process of claim 7, wherein the reducing agent is finely divided carbon.

9. The process of claim 1, wherein a residue remains after recovery of the alumina and an aqueous solution of alkali metal aluminate is separated from the residue by filtration.

10. A process for treating an alumina material containing 50 to 88% by weight of alumina based on the total weight of said material and 5 to 90% by weight of $Fe_2O_3$ based on the weight of alumina, which comprises intimately mixing said alumina material with an alkali metal carbonate or alkali metal bicarbonate at a mixing ratio of $Al_2O_3$:$Na_2O$ of from 1:1 to 1:3, molding the mixture into granules in the presence of 2 to 50% by weight of water based on the alumina material as a granulation medium, heat-treating the granules at a temperature of 800° to 900° C. for 10 to 30 minutes, leaching the heat-treated granules with an aqueous medium, and thereby substantially recovering the alumina from the alumina material in the form of an aqueous solution of an alkali metal aluminate, separating the alumina and leaving a residue substantially free of alkali.

11. The process of claim 10 wherein at least 90% of the alumina is recovered.

12. The process of claim 10 wherein the alumina material consists of bauxite.

* * * * *